US008095551B2

(12) United States Patent
Kountz et al.

(10) Patent No.: US 8,095,551 B2
(45) Date of Patent: Jan. 10, 2012

(54) ANNOTATING SHARED CONTACTS WITH PUBLIC DESCRIPTORS

(75) Inventors: John R. Kountz, Issaquah, WA (US); Matthew S. Augustine, Seattle, WA (US); Michael I. Torres, Seattle, WA (US); Oludare Obasanjo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 136 days.

(21) Appl. No.: 11/208,350

(22) Filed: Aug. 18, 2005

(65) Prior Publication Data
US 2007/0043688 A1 Feb. 22, 2007

(51) Int. Cl.
G06F 7/00 (2006.01)
G06F 17/30 (2006.01)
(52) U.S. Cl. .................. 707/758; 707/781; 707/783
(58) Field of Classification Search .............. 707/758, 707/781, 783, 999.204
See application file for complete search history.

(56) References Cited

U.S. PATENT DOCUMENTS

| 5,524,193 | A | 6/1996 | Covington et al. |
| 6,393,421 | B1 * | 5/2002 | Paglin .................. 707/9 |
| 7,177,880 | B2 * | 2/2007 | Ruvolo et al. ........... 707/104.1 |
| 2002/0054059 | A1 | 5/2002 | Schneiderman |
| 2002/0152216 | A1 * | 10/2002 | Bouthors ................. 707/10 |
| 2003/0167324 | A1 | 9/2003 | Farnham et al. |
| 2003/0233650 | A1 * | 12/2003 | Zaner et al. ............. 725/32 |
| 2004/0119760 | A1 | 6/2004 | Grossman et al. |
| 2004/0122803 | A1 * | 6/2004 | Dom et al. .............. 707/3 |
| 2004/0148275 | A1 * | 7/2004 | Achlioptas ............. 707/3 |
| 2004/0162830 | A1 * | 8/2004 | Shirwadkar et al. ....... 707/10 |
| 2004/0181592 | A1 | 9/2004 | Samra et al. |
| 2004/0205458 | A1 | 10/2004 | Hwang et al. |
| 2004/0210833 | A1 | 10/2004 | Lerner et al. |
| 2004/0215793 | A1 | 10/2004 | Ryan et al. |
| 2004/0230562 | A1 * | 11/2004 | Wysoczanski et al. ...... 707/1 |
| 2004/0237032 | A1 | 11/2004 | Miele et al. |
| 2005/0091272 | A1 * | 4/2005 | Smith et al. ............. 707/104.1 |
| 2005/0120084 | A1 | 6/2005 | Hu et al. |
| 2005/0154639 | A1 * | 7/2005 | Zetmeir ................. 705/14 |
| 2005/0171832 | A1 * | 8/2005 | Hull et al. .............. 705/10 |
| 2005/0193054 | A1 * | 9/2005 | Wilson et al. ............ 709/200 |
| 2005/0198031 | A1 * | 9/2005 | Pezaris et al. ............ 707/9 |
| 2005/0198085 | A1 * | 9/2005 | Blakey et al. ........... 707/204 |
| 2005/0198305 | A1 * | 9/2005 | Pezaris et al. ........... 709/227 |
| 2006/0041543 | A1 * | 2/2006 | Achlioptas ............. 707/3 |

(Continued)

FOREIGN PATENT DOCUMENTS
KR 1020000036287 A 7/2000
(Continued)

OTHER PUBLICATIONS

U.S. Appl. No. 60/695,239, filed Jun. 28, 2005.*
IBM; VideoAnnEx Annotation Tool http://www.research.ibm.com/VideoAnnEx/.
Richard Spinks et al., IBM; Document clipping with annotation, Apr. 1, 2001 http://www-128.ibm.com/developerworks/ibm/library/ibm-clip/index.html.
(Continued)

*Primary Examiner* — Jay Morrison
(74) *Attorney, Agent, or Firm* — Vierra Magen Marcus & DeNiro LLP

(57) ABSTRACT

A method for annotating shared contacts within a social network with public tags, notes or other data. This allows users of a social network to gain useful information at a glance about others' contacts within that network, as well as providing a means for filtering contacts within that network by user-defined keywords. Such a system improves and simplifies the ability of a user to discover new potential friends and business contacts.

18 Claims, 9 Drawing Sheets

U.S. PATENT DOCUMENTS

| | | | |
|---|---|---|---|
| 2006/0123127 A1* | 6/2006 | Littlefield | 709/229 |
| 2006/0190536 A1* | 8/2006 | Strong et al. | 709/204 |
| 2006/0218153 A1* | 9/2006 | Voon et al. | 707/10 |
| 2006/0294086 A1* | 12/2006 | Rose et al. | 707/3 |
| 2006/0294134 A1* | 12/2006 | Berkhim et al. | 707/102 |
| 2007/0112761 A1* | 5/2007 | Xu et al. | 707/5 |
| 2007/0185858 A1* | 8/2007 | Lu et al. | 707/5 |

FOREIGN PATENT DOCUMENTS

| | | |
|---|---|---|
| KR | 1020020019316 A | 3/2002 |
| KR | 1020030036277 A | 5/2003 |
| KR | 1020040034060 A | 4/2004 |
| WO | WO 99/46702 | 9/1999 |
| WO | WO 2004/075169 | 9/2004 |

OTHER PUBLICATIONS

Video; QT Easy Annotations http://www.apple.com/downloads/macosx/qteasyannotations.html.

Email & Chat; Gorilla World 3D interface http://www.apple.com/downloads/macosx/email_chat/gorillaworld3dinterface.html.

David Bargeron et al., Microsoft Reasearch, Annotations for Streaming Video on the Web: System Design and Usage Studies; Abstract http://research.microsoft.com/research/coet/MRAS/WWW8/paper.htm.

IBM; IBM Multimodal Annotation Tool, Aug. 9, 2002 http://www.alphaworks.ibm.com/tech/multimodalannotation.

* cited by examiner

ANNOTATING SHARED CONTACTS WITH PUBLIC DESCRIPTORS

BACKGROUND

1. Field of the Present System

The present system is directed to methods for annotating shared contacts within a social network with public tags and/or notes.

2. Description of the Related Art

Social networking via the Internet is emerging as a popular method of expanding and developing social and business relationships. A social network has been defined as a map of the relationships between individuals, showing how they are connected through various social ties ranging from casual acquaintance to close bonds. The term social network has also been used to refer to the network infrastructure for bringing people together and simplifying the way in which relationships may be mapped and developed. The idea behind social networking is that people can leverage their friends and acquaintances to meet other people of interest.

Social networks have been known in one form or another for thousands of years. However, with advent and proliferation of the Internet, large enterprise service providers, such as MSN®, Yahoo® and AOL® service providers, allow individuals access to a tremendous network of contacts, organized in a coherent structure and easily accessible with a network connection. Aside from size, organization and ease of access, another benefit to Internet social networks is the trust and reliability of the people within one's network. Even if a person does not know a friend of a friend, there is at least an inference of trust and reliability in that the first person can assume that his or her friend would not associate with a friend who was not reliable or trustworthy. At least, the immediate friend can be trusted to offer an honest assessment of the trustworthiness of the third party. Social networks are also often relied upon for opinion based information such as for example, movies, restaurants, travel locations and the like.

Despite all of these advantages, Internet social networks may fall victim to their own success. One's social network may easily become so large that there is no meaningful way to filter the network to identify useful potential contacts. At present, there are no satisfactorily structured methods to describe and filter the myriad relationships that may exist on one's social network.

SUMMARY

The present system, roughly described, relates to a method for annotating shared contacts within a social network with public tags and/or notes. This allows users of a social network to gain useful information at a glance about others' contacts within that network, as well as providing a means for filtering contacts within that network by user-defined keywords. Such a system improves and simplifies the ability of a user to discover new potential friends and business contacts.

In accordance with aspects of the present system, an owner of stored contacts may annotate those contacts with notes and/or tags, so that when the owner's contacts are viewed by others in the social network, the owner's notes and tags for the owner's contacts are displayed to the user. The note and/or tag information may be added to an owner's contact when the contact is created or after the contact is created. Notes and tags may also be amended or deleted by the owner after they are created.

The note is intended to give information about the contact and/or the relationship between the contact and the owner creating the annotation. Thus, anyone accessing the owner's contacts may quickly learn useful information about the owner's contacts and/or the contact's relationship to the owner. The tags are intended to be keywords describing the contact and/or the relationship between the contact and the owner who created the tag. Once the tags for a contact are created and saved, users viewing their social network will be given the option to filter their social network by keywords searches. The keyword search returns all contacts which included that keyword as a tag. In this manner, a user may quickly narrow a pool of contacts to only those possessing a particular characteristic or relationship of interest.

DETAILED DESCRIPTION

Embodiments of the present system will now be described with reference to FIGS. 1-9 which in general relate to a method for annotating shared contacts within a social network with public tags and/or notes. This allows users of a social network to gain useful information at a glance about others' contacts within that network, as well as providing a means for filtering contacts within that network by user-defined keywords. In general the present system improves the ability of a user to discover new potential friends and business contacts by enabling owners of a stored contact to annotate the contact with information about the contact.

A social network according to the present system may be implemented as part of a database for storing contact information on, for example, an enterprise service provider, such as MSN®, Yahoo®, AOL®, or other online service providers. It is understood that the database supporting the contact information of the present system may be stored on servers and processing devices other than for enterprise service providers in alternative embodiments.

Figure 1:
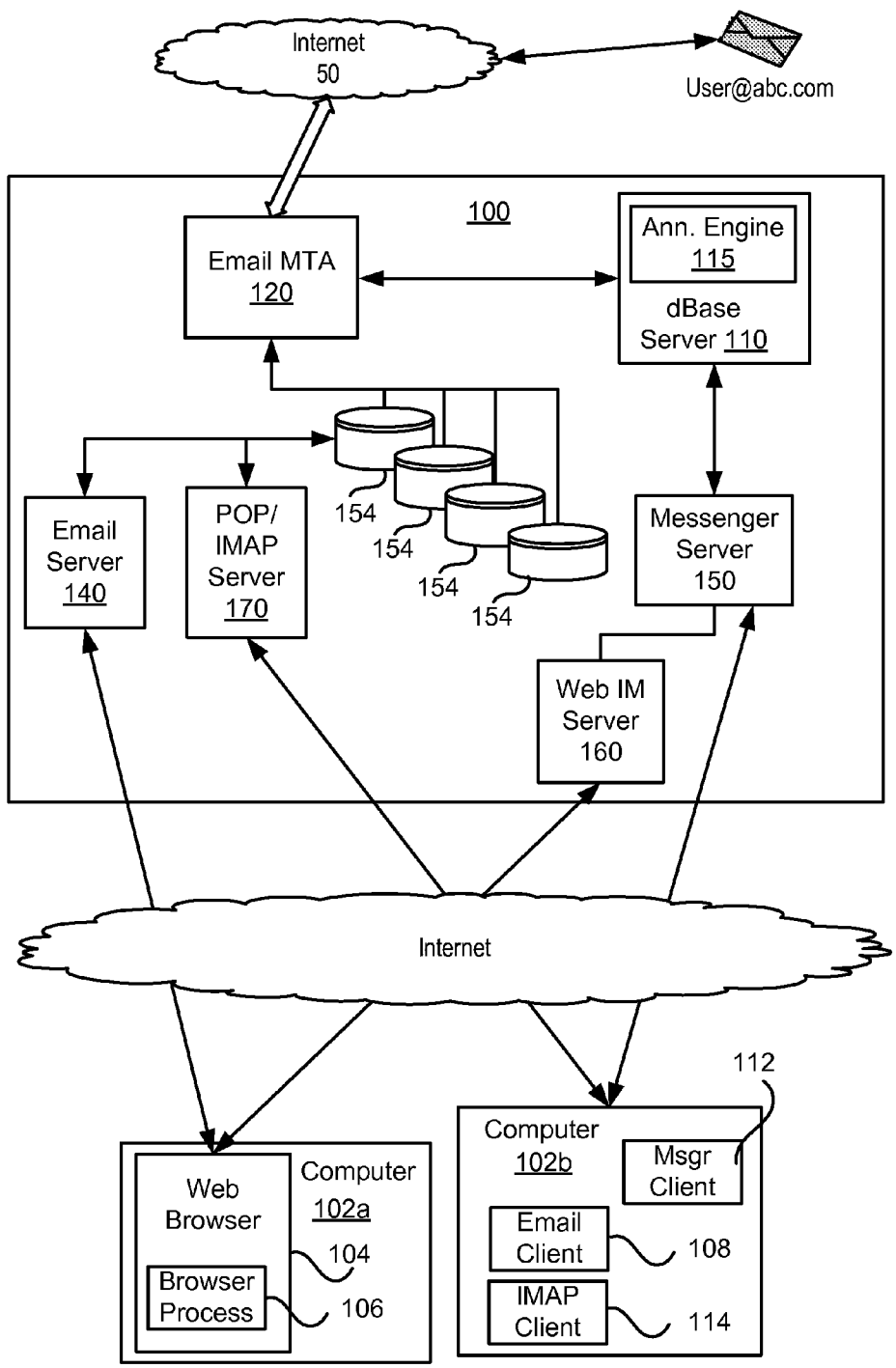
FIG. 1 is a block diagram of a system implementing one embodiment of the present system.

FIG. 1 is a block diagram illustrating an embodiment of a service provider system 100 which may be operated by an enterprise service provider such as MSN®, Yahoo®, AOL®, or other online service providers. The service provider system 100 may support different application interfaces allowing networked communication. For example, where service provider system 100 is that of the MSN® network, the system 100 may support an email application program such as MSN Hotmail®, as well as an instant messaging application program such as MSN Messenger.

System 100 is comprised of a plurality of computing devices maintained by an enterprise service provider. In one embodiment, it may consist, for example, of a message transfer agent (MTA) 120, a user information database server 110, user mail storage units 154, an email server 140, a POP/IMAP server 170, a messaging server 150 and a web integrated messaging server 160.

System 100 allows users operating processing devices 102a and 102b to access email, messenger, and other data, and forward outbound messages and messaging information to users within the domain of system 100 and domains accessible via the internet 50. Users may connect to the system 100 via any number of public or private networks including the Internet. The user database server 110 stores information allowing users to authenticate themselves to system 100 to access their email and internet messaging. In embodiments, the social network of contacts may be stored within database server 110. The server 110 may further include an annotation engine 115 as explained hereinafter for annotating stored contacts according to the present system. The database server 110 further allows other servers in the system to direct mail and messages within the system to storage locations on storage units 154.

Email server 140 may comprise a web server which provides an email interface to a web browser 108 which institutes a browser process 106 on the user computer 102a. Email server 140 can render email data from the data storage units to a user using computer 102a to access the email system 100. Likewise POP/IMAP server 170 can provide email data to a POP e-mail client 118 or an IMAP client 114 on user computer 102b. Messenger server 150 can provide information directly to a messenger client 112 or via a web internet messaging server 160 to web based messenger clients operating in a browser process 106 and web browser 104.

Inbound and outbound email messages from users on computers 102a and 102b are sent and received in system 100 via the MTA 120. Email MTA 120 generally uses SMTP to route mail via the internet 50 to users at other internet accessible domains. E-mail MTA 120 is a front-end server to which emails 190 transmitted via the internet to system 100 are directed and which forwarded messages from users of the messaging system 100 to other users on the internet 50. It should be understood that a web based enterprise service provider environment, a number of email MTAs 120 will be present.

The user database server 110 is a data store of user account and storage location information for each of the users having a user account or email address within system 100. As indicated, database server 110 further includes an annotation engine 115 for adding annotations to a social network of stored contacts. As explained in greater detail below, the annotation engine 115 receives annotations from an owner for one or more of their stored contacts and stores the information in tables within the database of database server 110. The annotation engine may also perform keyword searches of the database to find stored contacts that have been tagged with the keyword searched as explained hereinafter. It is understood that one or more aspects of the annotation engine may be performed on the client of an owner setting up the annotations instead of within service provider system 100.

Storage units 154 may essentially be large disk arrays storing user message information. The system may include additional components not shown here for the convenience in understanding the present system.

With the above service provider system, a stored contact from a social network may be accessible from and available to a user over any of a variety of application interfaces, such as for example an instant messaging application program, an email application program and/or a blog application program. A user may add a new contact to his or her social network when in one of the above-named application interfaces, or elsewhere, as is known in the art. In particular, when in an application program allowing the addition of a new contact, upon selecting the proper option as from a tool bar or drop down menu, the user may be presented with a window over the user's graphical user interface prompting the user to add information about the new contact. Such information may include name, address, company, telephone numbers, email addresses, website, the contact's screen name, etc.

In embodiments of a social network according to the present system, once a user adds a contact to his or her social network, a notification, or invitation, may be sent to the contact to determine whether the contact has added or would like to add that user to his or her contacts. If the invitation is accepted, there is said to be a two-way link, or a mutual friendship, between the contact and user, and each is part of the other's social network.

If the contact declines the invitation to add the user to the contact's social network, there is said to be a one-way link between the user and the contact, and the user may be referred to as a fan of the contact.

Figure 2:
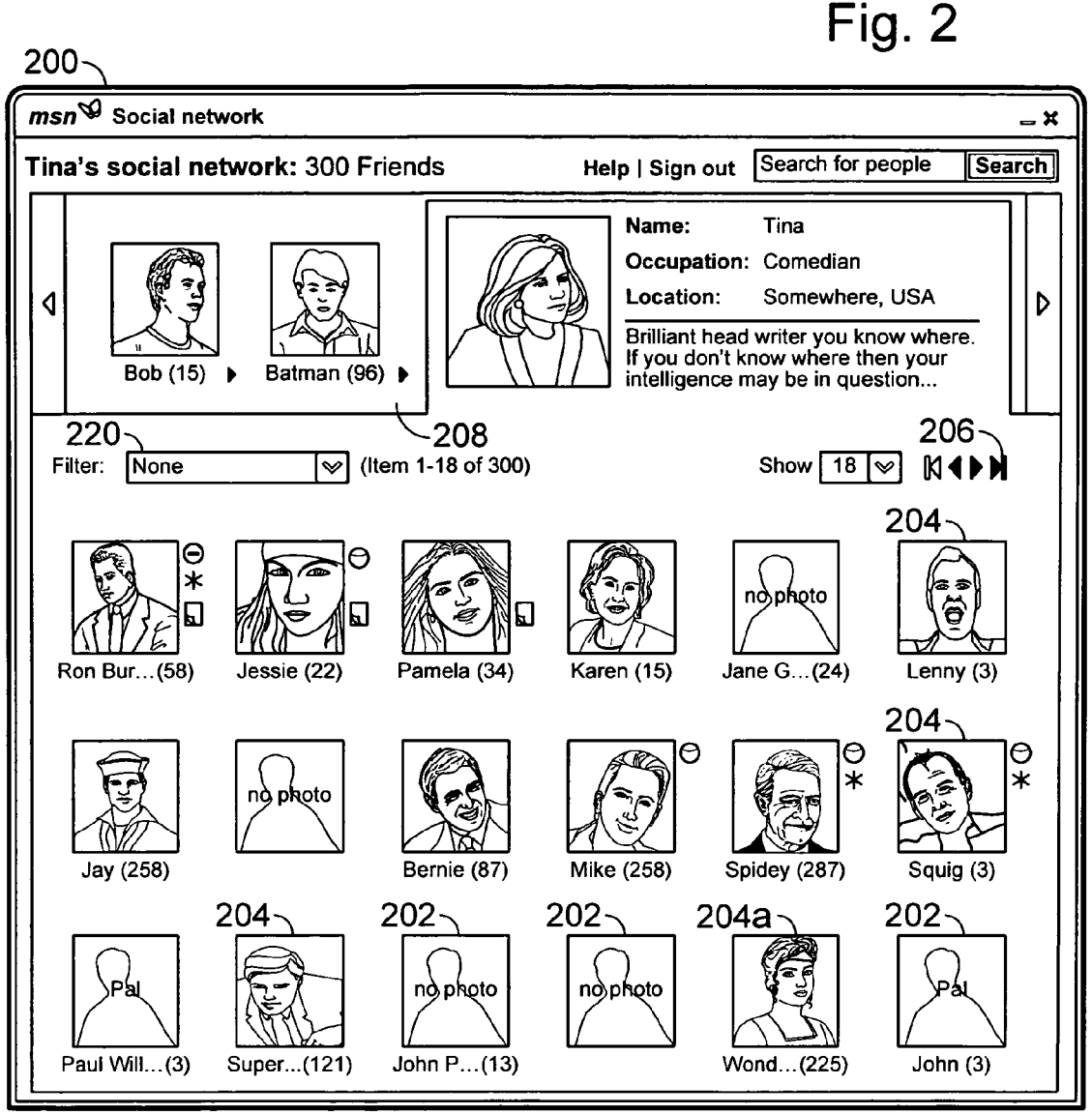
FIG. 2 is an illustrative window presented on a graphical user interface showing a page from a user's social network.
Figure 3:
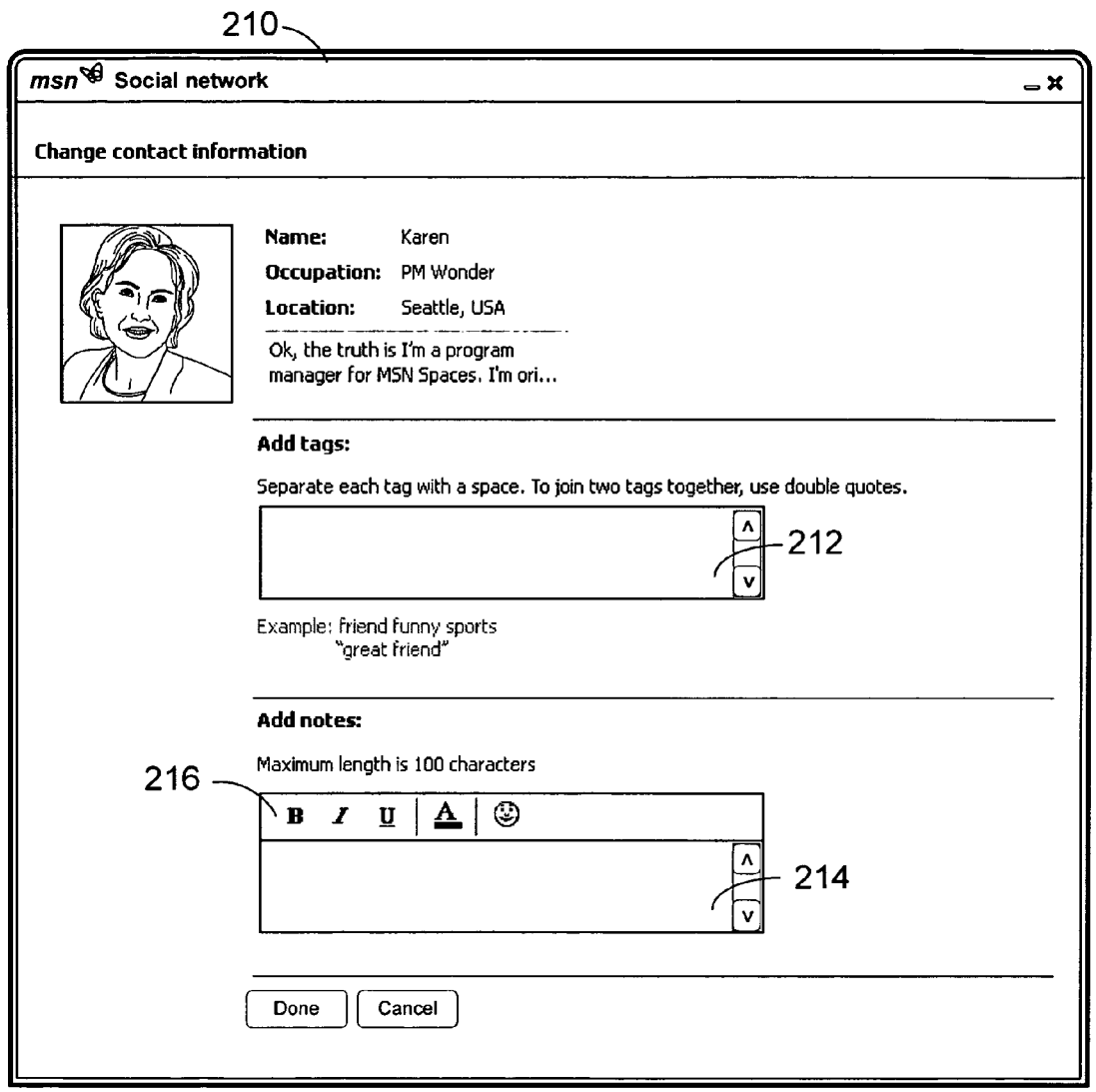
FIG. 3 is an illustrative window presented on a graphical user interface for entry of tags and/or a note to be associated with a stored contact according to an embodiment of the present system.

As shown in FIG. 2 explained hereinafter, a user may pull up a graphical user interface window showing all of the stored contacts within his or her social network. In the event there is a two-way link between a user and a particular stored contact, the particular stored contact may be appear on the user's social network with a graphical image, which may be a picture of the contact, or some other graphical representation selected by the contact. Where no graphical image is supplied by the contact, a predetermined image may be used (which indicates a two-way link between the contact and the user). On the other hand, should the contact decline the user's invitation and there exists only a one-way link between the user and the user's contact, the contact's selected graphical image would not be displayed in the user's social network in embodiments of the system. A generic image, such as a silhouette, may instead be shown for that contact.

A reverse listing table may also be stored for each contact in database server 110. When a user adds a contact to his or her social network, that user may be added to the contact's stored reverse listing. Thus, the contact can identify by accessing the reverse listing table everyone who has included that contact within their social network.

FIG. 2 is an illustration of a page 200 from a user's social network presented on a display 391 (FIG. 9) of a graphical user interface associated with a computing device 310 as explained hereinafter. The page 200 may be presented in response to a request made by a user on database server 110 via a browser running on the user's computing device.

By way of example only, the social network page 200 shows "Tina's" contacts, and in particular only the first 18 of the 300 stored contacts that Tina has in this example. The page also displays one or more portions of Tina's contact information, such as name, address, telephone, email, etc. Of the contacts of Tina's shown, some of them are shown in silhouette only, such as contacts 202, indicating that these contacts have not accepted a two-way link with Tina. Other contacts, such as contacts 204, have graphical images such photographs or other representations indicating a mutual friendship between Tina and those contacts 204. Tina may be view as the "owner" of the stored contacts displayed on page 200, as distinguished from a user who is viewing the contacts but did not create them.

Additional stored contacts for Tina may be viewed by "clicking" (with a graphical pointer under the control of a mouse or other pointing device as is known in the art) on navigation buttons 206 so show the next page of contacts in Tina's stored contacts. Additionally, the contacts 204 may be live hyperlinks so that when one is clicked, the database server 110 provides the contacts of the selected contact 204. For example, if the user were to click on the contact 204a (screen name "Wonder Woman"), the user may be presented with a page similar to page 200 but showing Wonder Woman's contacts. In turn, a mutual friend shown on Wonder Woman's contacts may be clicked on to access that person's contacts, and so on.

The successive assessing of contacts of contacts may be viewed as accessing different contact levels. An indication of the different contact levels may be shown for example at a trail 208 on page 200. In this example, the user previously viewed "Bob's" contacts, where the user found and accessed "Batman's" contacts. From Batman's contacts, the user found and accessed Tina's contacts to generate the page 200 shown in FIG. 2. Similarly, were the user to click on Wonder Woman's icon, Wonder Woman's icon would appear next to Tina's graphical image in trail 208. Thus a trail 208 of the different contact levels viewed by the user may be maintained, all the way back to the first list of contacts, which would be the user's in embodiments of the present system. The trail may be navigated by navigation icon 210 to return to previous contact levels. In embodiments, the trail may include only preset number of previously viewed contacts.

In embodiments, the silhouetted contacts 202 are not live hyperlinks, and the user would not be able to view the stored contacts on a contact 202's social network. This is because contacts 202 did not give permission to Tina for their contacts to be shared. Although contacts 202 did not give permission to Tina to share their contacts, a contact 202 may be a mutual friend to another contact in the user's social network, and their stored contacts may be accessed through that path.

As some contacts, such as Tina in the example of FIG. 2, have a large number of contacts, embodiments of the present system allow a contact to prioritize the order in which their stored contacts are presented when displayed. An owner may be presented with a window (not shown) for prioritizing their own contacts. The window may give the owner the ability to classify a contact in a general category, i.e., high priority (list in top third of displayed contacts), medium priority (list in middle third of displayed contacts) and low priority (list in bottom third of displayed contacts). Other degrees of granulation are contemplated. Alternatively, the user may be given the option to define specific display positions for their contacts, i.e., list this person first; list this person on the first page, etc. The sort order of an owner's stored contacts may be considered an annotation applied to an owner's shared contacts, in a manner similar to annotated notes, tags and other stored data as explained hereinafter.

In accordance with aspects of the present system, an owner, for example Tina in FIG. 2, may annotate her stored contacts with text referred to herein as notes and/or tags, so that when the owner's contacts are viewed by the user, the owner's notes and tags regarding his or her contacts are displayed to the user. In this way, the user can quickly and easily discern and filter information about the owner's contacts which may be important to the user.

The note and/or tag information may be added to an owner's contact when the contact is created or after the contact is created. As an example, an owner may select an option from a tool bar or drop down menu presenting a stored contact page, such as page 210 shown in FIG. 3 for a contact named Karen. Page 210 may present the owner with text boxes 212 and 214 for adding tags and notes, respectively. In particular, text added in the tag box 212 is stored by annotation engine 115 as part of a record for Karen in an indexed and searchable table in database server 110 as explained in greater detail below. Similarly, text added in the note box 214 is stored by annotation engine 115 as part of a record for Karen in a table in database server 110. In embodiments, the text added in a note for Karen is not searchable, but it may be in alternative embodiments.

Referring first to the note box 214, in embodiments, the box 214 may accept up to 1000 characters (so that notes are kept relatively short), but more or less characters may be accepted in alternative embodiments. A formatting bar 216 may be included to allow an owner to format a note in different text styles and, in embodiments, to add different symbols or emoticons. In embodiments, the note box would not be configured to accept hypertext markup links, but could accept such links in alternative embodiments.

The note is intended to give information about the contact and/or the relationship between the contact and the owner creating the annotation. Thus, anyone accessing the owner's contacts may quickly learn useful information about the owner's contacts and/or the contact's relationship to the owner. However, there is no limitation in the type of information that may be included in a note.

In embodiments, the tag box 212 may accept up to fifteen tags for each contact, of up to twenty characters for each tag. More or less tags and characters per tag may be accepted in alternative embodiments. Each separate tag may be entered separated by spaces, although other methods for indicating the end of one tag and the beginning of another are possible. Tags more than one word long may be indicated by quotes around the tag. In embodiments, the tag box would not be configured to accept hypertext markup links, but could accept such links in alternative embodiments.

The tags are intended to be keywords describing the contact and/or the relationship between the contact and the owner making the tag annotation. Once the tags for a contact are created and saved to database 110 by annotation engine 115, users viewing their social network will be given the option to filter their social networks by keywords searches. For example, referring again to FIG. 2, there is shown a filter pane 220 in which a user may enter one or more keywords. Upon entry of a keyword, the annotation engine 115 may initiate a search through all contacts stored on database server 110 for the then displayed owner (Tina, in the example of FIG. 2). The engine would return to the user all contacts which included that keyword as a tag or, in embodiments, as part of a tag. In further embodiments, the search may not be limited to just the contacts of the owner then being viewed, but rather a keyword search of all stored contacts on the user's social network may be performed by annotation engine 115 to return all contacts having a tag matching the keyword search. In this manner, a user may quickly narrow a pool of contacts to only those possessing a particular characteristic or relationship. It is understood that the searching of database server 110 may be performed by components other than annotation engine 115 in alternative embodiments.

As indicated above, once an owner is satisfied with the text they have included as a note and/or tag for a given contact, the owner may complete the action by engine 115 saving the information to the database server 110. In embodiments, the owner may enter both a note and a tag for a contact, or simply one or the other. After a note and/or tags are created and saved for a stored contact, the note and/or tags may be amended or deleted. The owner may again pull up the page for the stored contact. The existing note and/or tag may appear in the text boxes 212, 214. The owner may thereafter amend or delete the note and/or tag as desired and then save the new data to database 110 as explained above.

Figure 4:
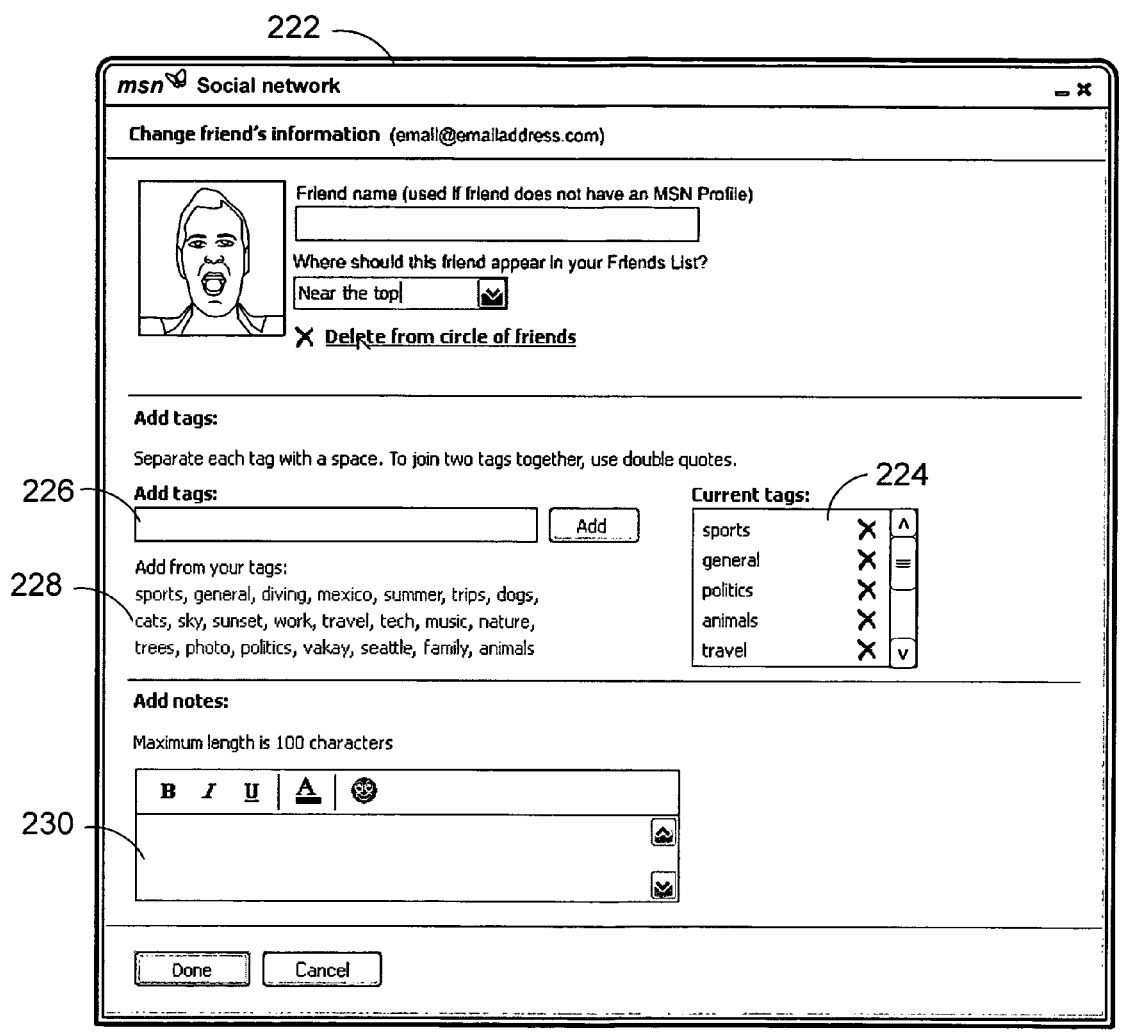
FIG. 4 is an illustrative window presented on a graphical user interface for entry of tags and/or a note to be associated with a stored contact according to a further embodiment of the present system.

FIG. 4 presents an alternative page 222 for adding, amending and/or deleting a note and/or tag for a given stored contact. Page 222 may include a pane 224 showing a list of the tags currently saved for that contact. The owner may remove some or all of those saved tags. Similarly, the page 222 may present a text box 226 allowing the user to add tags for that contact. The page 222 may further present a list 228 of all tags previously used by that owner for his or her stored contacts. List 228 may be omitted in alternative embodiments.

Similarly, page 222 may present a text box 230 for adding, amending or deleting a note for the contact. If a note was currently saved for that contact, the note could appear in box 230 when page 222 is presented to the owner. Once the additions, alterations and/or deletions to the contact's tags and/or note are finished, the action may be completed by saving the new tags and/or note to database server 110. Those of skill in the art will appreciate that the note and the tag may be added, amended and/or deleted, and thereafter saved to a database, by a wide variety of user interfaces other than the page 210 shown in FIG. 3 and page 222 shown in FIG. 4.

Figure 5:
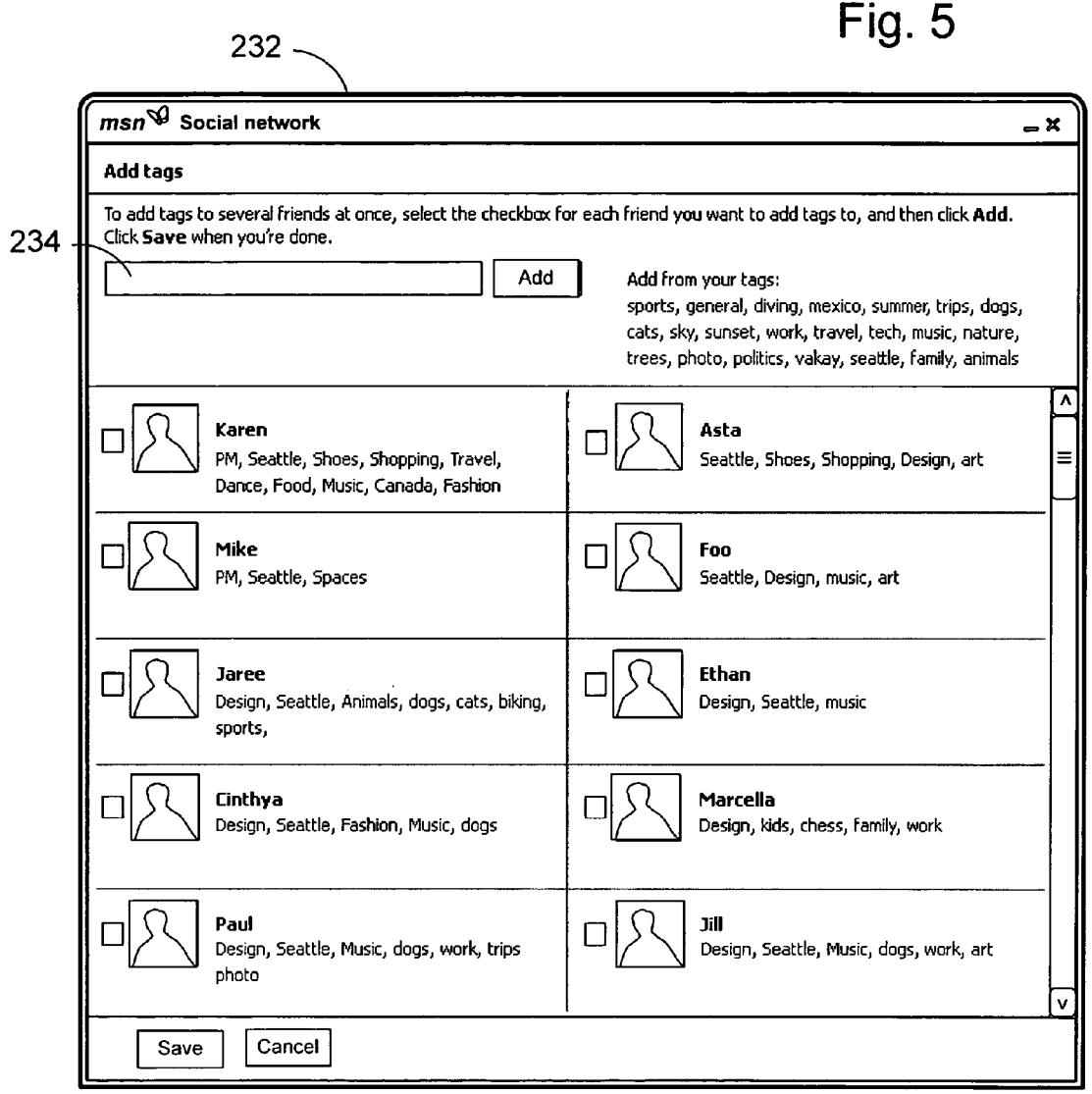
FIG. 5 is an illustrative window presented on a graphical user interface for entry of a tag and/or a note to be associated with a plurality of stored contacts according to an embodiment of the present system.

In order to improve the efficiency of entering tags for an owner's contacts, the owner may be given the option through a tool bar or drop down menu to add a given tag to a plurality of contacts at the same time. Such an option is shown for example on page 232 on FIG. 5. As shown, the owner may have been given the option to select a plurality of stored contacts, and thereafter enter one or more tags in a text box 234, which tag(s) are then saved by annotation engine 115 for each of the selected contacts. While less likely to be useful for notes, it is understood that a page similar to page 232 may be provided for allowing an owner to add a note to a plurality of stored contacts. The ability to add a tag or note to a plurality of contacts as shown in FIG. 5 may be omitted in alternative embodiments.

FIG. 6 again shows the example of Tina's contacts (as in FIG. 2) on a page 240. However Tina has created a note and tags for one of her contacts, Pamela, as shown in window 242. Window 242 may be generated and displayed by the user's client upon receipt of the note and/or tag information from database server 110. The server 110 may forward such information to the client whenever a contact having note and/or tag information is displayed.

In embodiments, the note and tag window 242 for Pamela may be shown whenever Pamela's contact information is displayed. The same would be true for any other contact having a note and/or tag. Alternatively, the note and tag window 242 for Pamela may be shown only when Pamela's contact image is traversed by the graphical pointer. As a further alternative, an icon or symbol may be placed next to each contact having a note or tag. A single icon/symbol may be presented indicating the presence of a note and/or tag. Alternatively, different icons/symbols may be presented, one for a note and one for a tag. In such an embodiment, the existence of a note and/or tag for Pamela may be indicated by the icon/symbol and the window 242 shown only when Pamela's contact image is traversed by the graphical pointer, or when the icon/symbol is clicked on using the graphical pointer and pointing device. The window 242 may be closed by the user after viewing the note and tags. It is understood that a note or tag may be displayed for any other displayed contact in the same manner.

Figure 6:
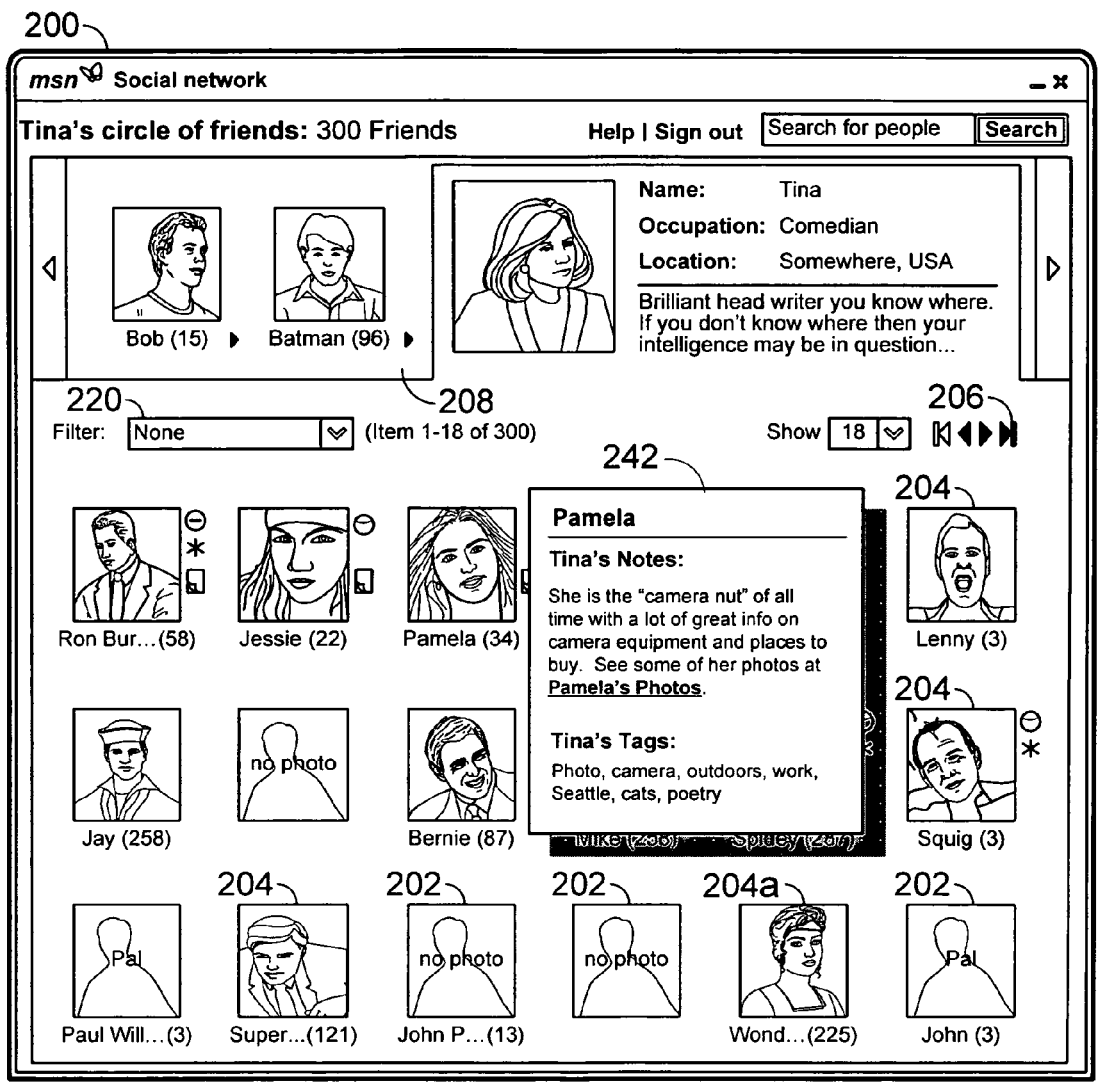
FIG. 6 is an illustrative window presented on a graphical user interface showing a page from a user's social network including a tag and a note annotated to a particular contact.
Figure 7:
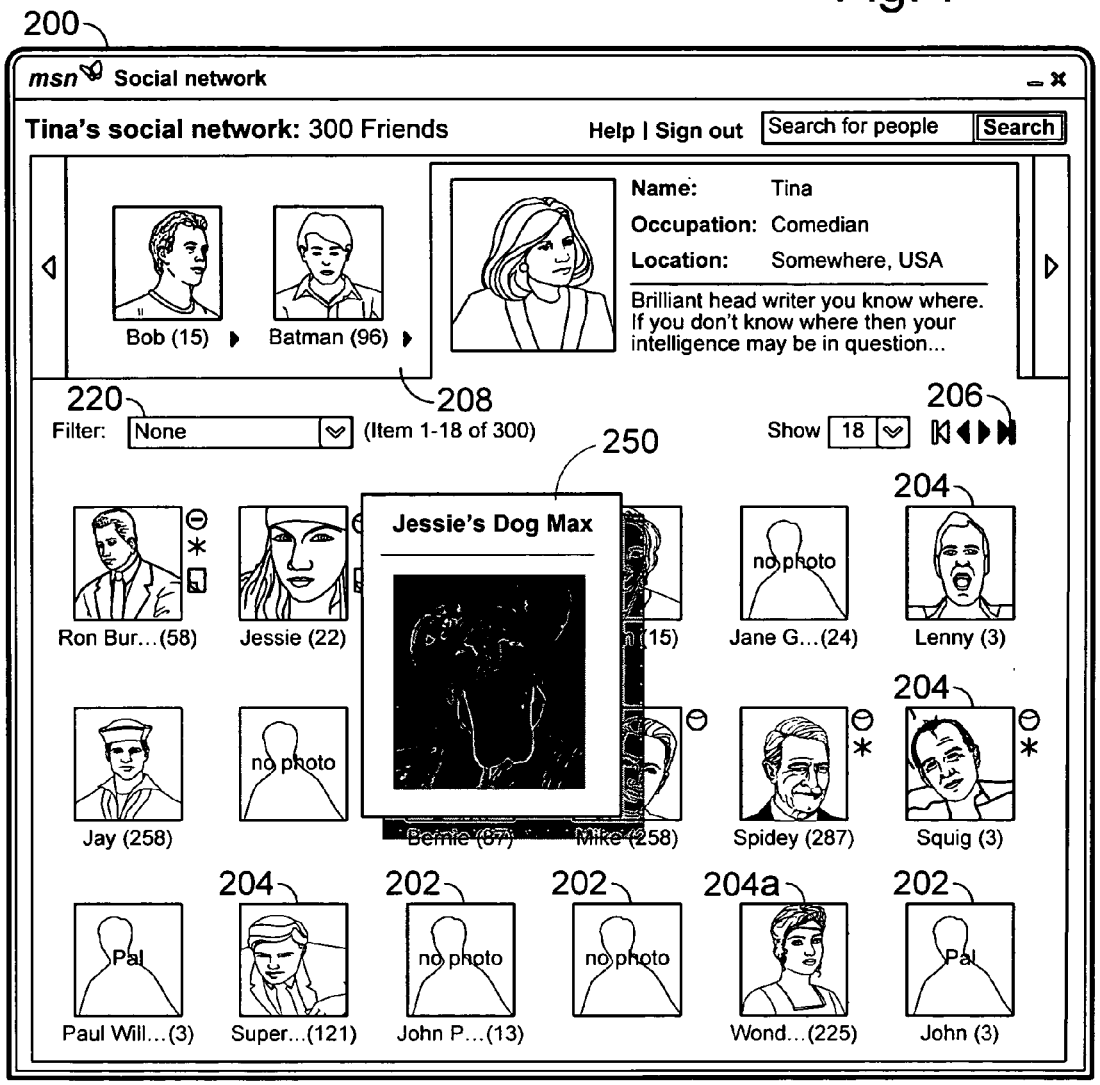
FIG. 7 is an illustrative window presented on a graphical user interface showing a page from a user's social network including a graphical image annotated to a particular contact.
Figure 8:
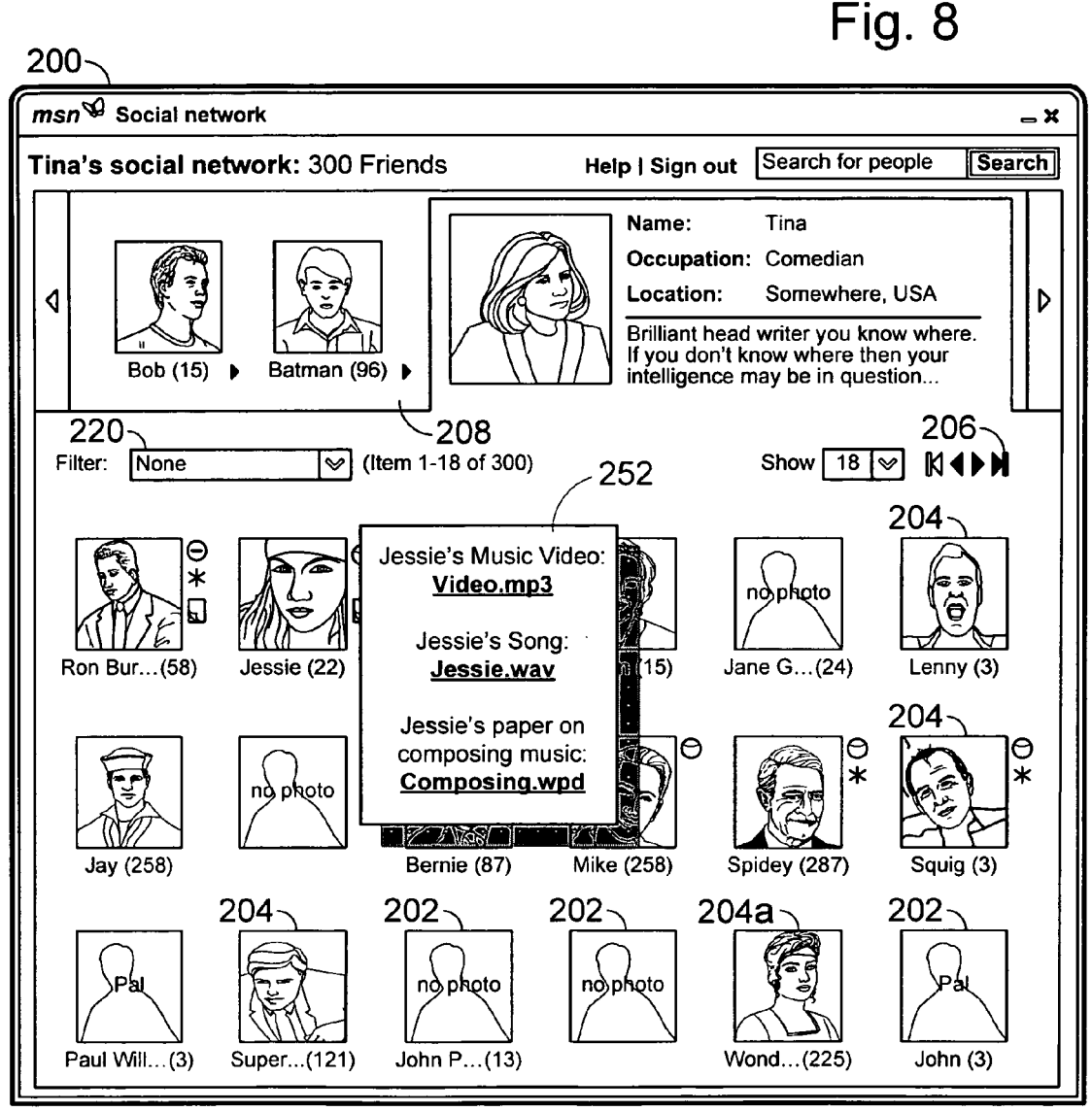
FIG. 8 is an illustrative window presented on a graphical user interface showing a page from a user's social network including stored annotated to a particular contact.

The window 242 in FIG. 6 is shown as a single window housing both the note and the tags for Pamela. The note and the tags may alternatively be provided in separate windows.

While the above-described embodiments have referred to notes and tags being annotated to a stored contact, it is understood that a wide variety of other data may be annotated to a stored contact to describe the contact, indicate a relationship with an owner, or provide other information. For example, an owner may annotate a stored contact with a photograph, picture or other graphical image. For example, in FIG. 7, the owner has annotated Jessie's stored contact with a photograph of Jessie's dog, Max in a window 250. Moreover, an owner may annotate a stored contact with a link to one or more files. For example, in FIG. 8, the owner has annotated Jessie's stored contact with a link to a video file, a link to an audio file and a link to a text file in a window 252. The data for the graphical images, video clips, audio files and/or text files may be stored in database 110 or elsewhere. It is understood that a stored contact may be annotated with more than one of a note, tag, graphical image, link to a video clip, link to an audio file and link to a text file. It is further understood that a wide variety of other data may be annotated to a stored contact for presentation to others in accordance with embodiments of the present system.

A user may view all notes, tags and other data created by different owners for their own contacts across the various contact levels of the user's social network. However, in embodiments, the user would not have the ability to add to, alter or delete a note, tag or other data associated with a stored contact unless the data was for a user's own contacts. Thus, as an example, only Tina would have the ability to add to, alter or delete Pamela's note or tags. However, a user may get in touch with an owner for the contact to update his or her contacts' data. Moreover, in an alternative embodiment, a user may have limited or full authority and ability to add to, alter and/or delete a note, tag or other data created by another owner for that owner's contacts. That authority may be freely available in embodiments. Alternatively, that authority may be selectively granted to the user as desired by the owner who created the note, tags and/or data in further embodiments.

In embodiments, an owner may annotate one of their stored contacts regardless of whether the owner is a mutual friend of the stored contact or only a fan of the stored contact. In alternative embodiments, an owner may be prevented from annotating a stored contact unless a two-way link exists between the owner and the stored contact.

Figure 9:
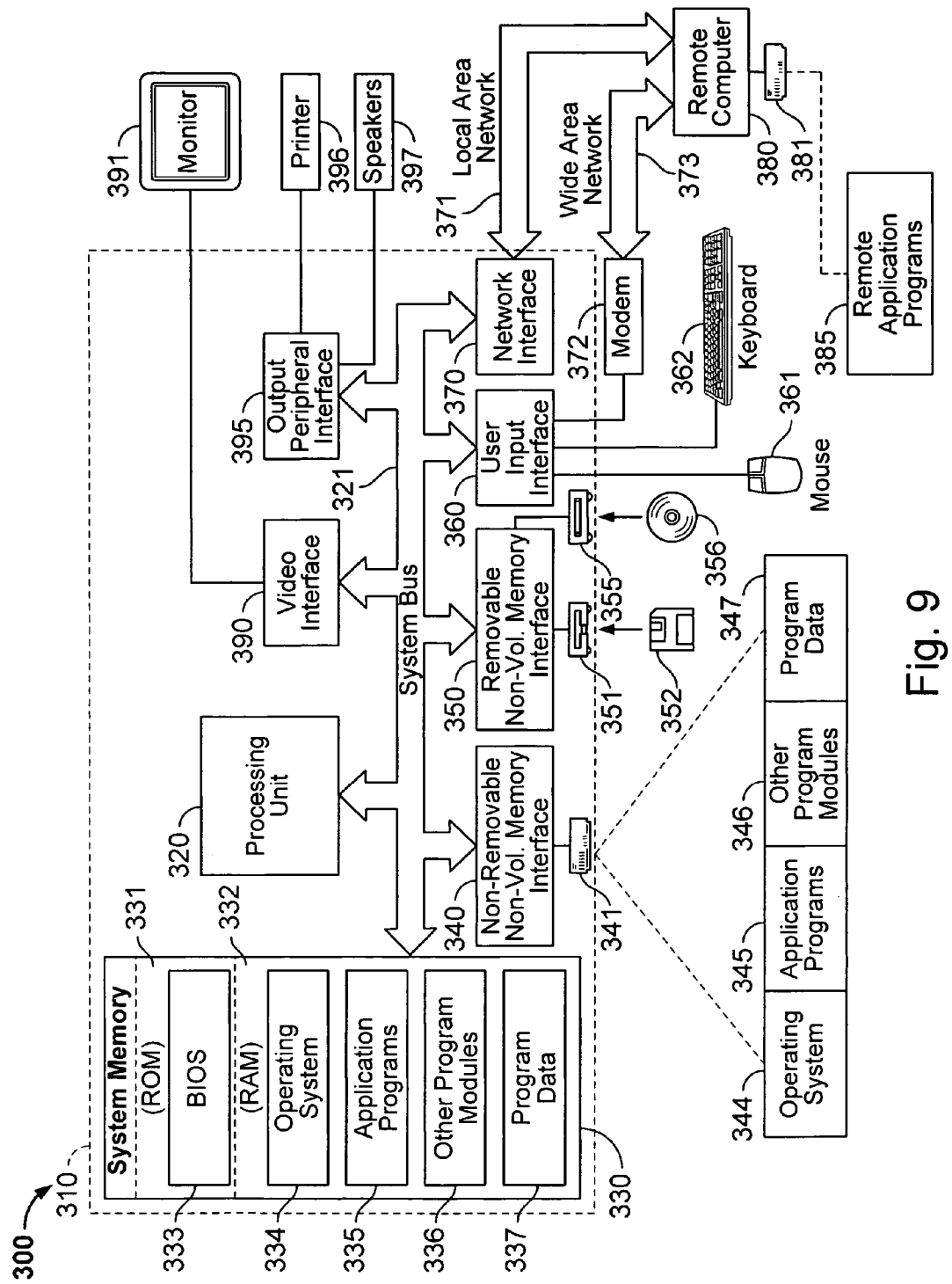
FIG. 9 is a block diagram of computer hardware suitable for implementing embodiments of the present system.

FIG. 9 illustrates an example of a suitable general computing system environment 300 that may comprise any processing device shown herein on which the inventive system may be implemented. The computing system environment 300 is only one example of a suitable computing environment and is not intended to suggest any limitation as to the scope of use or functionality of the inventive system. Neither should the computing system environment 300 be interpreted as having any dependency or requirement relating to any one or combination of components illustrated in the exemplary computing system environment 300.

The inventive system is operational with numerous other general purpose or special purpose computing systems, environments or configurations. Examples of well known computing systems, environments and/or configurations that may be suitable for use with the inventive system include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

With reference to FIG. 9, an exemplary system for implementing the inventive system includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 may include a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile discs (DVD) or other optical disc storage, magnetic cassettes, magnetic tape, magnetic disc storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 330 includes computer storage media in the form of volatile and/or nonvolatile memory such as read only memory (ROM) 331 and random access memory (RAM) 332. A basic input/output system (BIOS) 333, containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 9 illustrates operating system 334, application programs 335, other program modules 336, and program data 337.

The computer 310 may also include other removable/non-removable, volatile/nonvolatile computer storage media. By way of example only, FIG. 9 illustrates a hard disc drive 341 that reads from or writes to non-removable, nonvolatile magnetic media and a magnetic disc drive 351 that reads from or writes to a removable, nonvolatile magnetic disc 352. Computer 310 may further include an optical media reading device 355 to read and/or write to an optical media 300.

Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disc drive 341 is typically connected to the system bus 321 through a non-removable memory interface such as interface 340, magnetic disc drive 351 and optical media reading device 355 are typically connected to the system bus 321 by a removable memory interface, such as interface 350.

The drives and their associated computer storage media discussed above and illustrated in FIG. 9, provide storage of computer readable instructions, data structures, program modules and other data for the computer 310. In FIG. 9, for example, hard disc drive 341 is illustrated as storing operating system 344, application programs 345, other program modules 346, and program data 347. These components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and a pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 9. The logical connections depicted in FIG. 9 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 9 illustrates remote application programs 385 as residing on memory device 381. It will be appreciated that the network connections shown are exemplary and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A method of providing a social network, the method comprising the steps of:
   (a) storing a contact on a central database, the contact created by an owner of the contact, and the contact accessible by a plurality of users other than the owner who have subscribed to have access to contacts on the central database, and who have the owner's permission to view the owner's contacts;
   (b) receiving data for an annotation to the stored contact, the data generated by the owner of the stored contact, the annotation at least describing a relationship between the stored contact and the owner, the data relating to a note to be annotated to the stored contact or to a keyword tag to be annotated to the stored contact, the note entered in a first field allowing freeform, owner-originated text relating to any notes the owner desires to add regarding the stored contact, and the data relating to a searchable keyword tag entered in a second field allowing freeform, owner-originated text relating to any keyword tag the owner desires to add regarding the stored contact; and
   (c) storing the data for the annotation, the stored data being accessible along with the contact to the plurality of users who have subscribed to have access to the contacts on the central database.

2. A method as recited in claim 1, further comprising a step of displaying the annotation together with the stored contact, the content of the annotation being based on the data.

3. A method as recited in claim 1, further comprising a step of displaying the annotation together with the stored contact when a displayed icon associated with the stored contact is selected.

4. A method as recited in claim 1, further comprising a step of presenting the owner with a window over a graphical user interface allowing the owner to enter the data.

5. A method as recited in claim 1, said step (b) of receiving data comprising the step of receiving a note the owner generated about the stored contact.

6. A method as recited in claim 5, the note relating to at least one of a characteristic of the stored contact and a relationship of the stored contact to the owner.

7. A method as recited in claim 5, the note being generated using natural language text.

8. A method as recited in claim 1, the method further comprising the step of providing a keyword search capability to search for stored contacts in the social network by the keyword tag.

9. A method as recited in claim 1, the keyword tag relating to at least one of a characteristic of the stored contact and a relationship of the stored contact to the owner.

10. A method of providing a social network, comprising the steps of:
    (a) storing a contact on a central database, the contact created by an owner of the contact, and the contact accessible by a plurality of users other than the owner who have subscribed to have access to contacts on the central database, and who have the owner's permission to view the owner's contacts;
    (b) displaying a user interface allowing an owner of the stored contact to provide data for an annotation to the stored contact, the data entered in a field allowing freeform, owner-originated information including at least one of text, graphics and hyperlinks relating to any information the owner desires to add regarding the stored contact;
    (c) storing data for the annotation to the stored contact, the data for the annotation including one or more notes the owner has added regarding the user and the annotation including one or more searchable keyword tags the owner has added regarding the user, the data for both the notes and one or more keyword tags being customizable by the owner and including owner-originated text relating to information describing a relationship of the stored contact to the owner of the stored contact; and
    (d) affecting annotation of the stored contact with the data when the stored contact is displayed to the plurality of users having access to the owner's stored contacts.

11. A method as recited in claim 10, said step (c) of storing data for the annotation to the stored contact comprising the step of storing the data on an enterprise service provider database.

12. A method as recited in claim 10, said step (d) of affecting annotation of the stored contact with the data comprising the step of displaying the stored contact together with at least one of an associated note, an associated graphical image, a link to an associated video clip, a link to an associated audio file and a link to an associated text file.

13. A method as recited in claim 10, the method further comprising the step of providing a keyword search capability to search for stored contacts in the social network by the keyword tag.

14. A method as recited in claim 13, the method further comprising the step of providing an option to prioritize the position of the stored contact relative to other stored contacts when the stored contact is displayed based on the results of a keyword search performed via the keyword search capability.

15. A method of providing a social network, comprising the steps of:
    (a) storing a plurality of contacts on a central database, the contacts created by an owner of the contacts, and the contacts accessible by a plurality of users other than the owner who have subscribed to have access to contacts on the central database, and who have the owner's permission to view the owner's contacts;
    (b) storing a searchable tag associated with a stored contact of a plurality of stored contacts, the tag generated by the owner of the stored contact, the tag including keywords describing a relationship between the stored contact and the owner of the stored contact, the tag further entered in a field allowing freeform, owner-originated text relating to any information the owner desires to add regarding the stored contact;

(c) annotating the tag to the stored contact when the stored contact is displayed to the plurality of users having access to the owner's stored contacts; and (d) selecting the stored contact for inclusion in a group of contacts of the plurality of stored contacts in response to a keyword search for stored contacts having one or more of the keywords of the associated tag.

16. A method as recited in claim 15, said step (b) of storing a tag associated with the stored contact comprising the step of storing the tag on an enterprise service provider database.

17. A method as recited in claim 15, further comprising the step of displaying the group of stored contacts selected in said step (d).

18. A method as recited in claim 15, further comprising the steps of:

(e) storing a note associated with a stored contact of a plurality of stored contacts, the note generated by the owner of the stored contact; and (f) annotating the note to the stored contact when the stored contact is displayed to individuals having access to the social network.

* * * * *